United States Patent [19]

Young et al.

[11] Patent Number: 5,292,844

[45] Date of Patent: Mar. 8, 1994

[54] VINYL ACETATE MODIFIED SUSPENSION POLYMER BEADS, ADHESIVES MADE THEREFROM AND A METHOD OF MAKING

[75] Inventors: Chung I. Young, St. Paul; Stephen E. Krampe, Maplewood, both of Minn.

[73] Assignee: Minnesota Mining and Manufacturing Company, St. Paul, Minn.

[21] Appl. No.: 74,991

[22] Filed: Jun. 10, 1993

Related U.S. Application Data

[63] Continuation of Ser. No. 998,257, Dec. 31, 1992, abandoned, which is a continuation of Ser. No. 703,891, May 22, 1991, abandoned.

[51] Int. Cl.$^5$ ............... C08F 220/18; C08F 220/40
[52] U.S. Cl. ............... 526/329.5; 428/515; 524/460; 526/264; 526/307.6; 526/307.7; 526/318.4; 526/318.44; 526/330
[58] Field of Search ............ 526/318.44, 329.5, 330; 524/460

[56] References Cited

U.S. PATENT DOCUMENTS

| | | | |
|---|---|---|---|
| 3,654,213 | 4/1972 | Christensen et al. | 260/33.6 |
| 3,697,618 | 10/1972 | Grunewalder | 526/271 |
| 4,069,123 | 1/1978 | Skoultchi et al. | 204/159.18 |
| 4,319,012 | 3/1982 | Morningstar | 526/202 |
| 4,360,651 | 11/1982 | Dinbergs | 526/88 |
| 4,645,783 | 2/1987 | Kinoshita | 523/221 |
| 4,725,639 | 2/1988 | Lenney | 524/460 |
| 4,833,179 | 5/1989 | Young | 522/183 |
| 4,835,084 | 5/1989 | Nair | 430/137 |
| 4,845,149 | 7/1989 | Frazee | 524/458 |
| 4,868,238 | 9/1989 | Craig | 524/457 |
| 4,952,650 | 8/1990 | Young | 526/194 |
| 4,968,562 | 11/1990 | Delgado | 428/402 |

FOREIGN PATENT DOCUMENTS

| | | |
|---|---|---|
| 2026427 | 3/1991 | Canada. |
| 0297902 | 7/1988 | European Pat. Off. ..... C08F 220/12 |
| 63-254564 | 10/1988 | Japan ............... C09J 7/00 |

OTHER PUBLICATIONS

"Solvents", *Paint Testing Manual*, 13th Ed., Seward, G. G., Editor, American Society for Testing and Materials, Phila., Penna., 1972.

(List continued on next page.)

*Primary Examiner*—Joseph L. Schofer
*Assistant Examiner*—Fred Zitomer
*Attorney, Agent, or Firm*—Gary L. Griswold; Walter N. Kirn; Janice L. Dowdall

[57] ABSTRACT

The present invention relates to a method of suspension polymerization of a pressure-sensitive acrylate copolymer bead having a glass transition temperature of 0° C. or less which are storage stable in addition to being extrudable at temperature below about 340° F. (171° C.). The method comprises making a monomer-containing premix comprising (i) about 70 to about 98 parts by weight of an acrylic acid ester monomer of non-tertiary alcohol, the alcohol having from 1 to 14 carbon atoms, with the average number of carbon atoms being about 4 to about 12, (ii) about 1 to about 10 parts of a polar monomer copolymerizable with the acrylic acid ester, and (iii) about 1 to about 40 parts vinyl acetate monomer, wherein (i), (ii), and (iii) comprise 100 parts of the monomer-containing premix, (iv) about 0.01 to about 0 5 part by weight chain transfer agent, and (v) about 0.05 to about 1.0 part by weight free-radical initiator, wherein (iv) and (v) are each independently based upon 100 parts by weight total monomer content and wherein about 0.05 to about 30 parts by weight modifier moiety based upon 100 parts by weight total monomer content is present in one or more of the following: said monomer-containing premix, said water phase; the oil-in-water suspension; the aqueous suspension of polymer beads after the exotherm of the polymerization has been reached. The monomer-containing premix is then combined with a water phase containing a sufficient amount of suspending agent to form a suspension. The suspension is concurrently agitated and polymerization of the monomer is permitted until polymer beads are formed. The polymer beads are then collected. The invention also relates to the polymer beads themselves and adhesives prepared therefrom.

26 Claims, No Drawings

OTHER PUBLICATIONS

"A Three-Dimensional Approach to Solubility", *Journal of Paint Technology*, vol. 38, No. 496, pp. 269–280.

*Handbook of Pressure Sensitive Adhesive Technology*, (Donatas Satas, 2nd Ed., p. 402, Van Nostrand Reinhold, 1989.

44 *Polymer Handbook*, 2nd Ed., Wily Interscience, N.Y., 1975, copy not available.

J. W. Vanderhoff, "The Making of a Polymer Colloid", *Science and Technology of Polymer Colloids*, vol. 1, pp. 1–39, Poehlein/Ottweill/Goodwin (Editors).

Sax, N. I. & Lewis, R. J., "Hawley's Condensed Chemical Dictionary", 11th Ed, 925 (1987) Van Nostrand Reinhold (New York).

VINYL ACETATE MODIFIED SUSPENSION POLYMER BEADS, ADHESIVES MADE THEREFROM AND A METHOD OF MAKING

This is a continuation of application Ser. No. 07/998,257 filed Dec. 31, 1992 now abandoned, which is a file wrapper continuation of application Ser. No. 07/703,891 filed May 22, 1991 now abandoned.

TECHNICAL FIELD

The present invention relates to a novel method for aqueous suspension polymerization of non-agglomerating storage stable acrylate copolymer pressure sensitive adhesive (PSA) beads which are extrudable at low temperatures. The invention also relates to the copolymer PSA beads and adhesives made therefrom.

BACKGROUND OF THE INVENTION

U.S. Pat. Nos. 4,833,179 and 4,952,650 Young et al., assigned to the assignee of the present case, both incorporated by reference herein, relate to a method for suspension polymerization of a pressure-sensitive acrylatecopolymer bead having a glass transition temperature of 0° C. or less. The method comprises making a monomer premix comprising an acrylic acid ester of non-tertiary alcohol, the alcohol having from 1 to 14 carbon atoms, with the average number of carbon atoms being about 4 to about 12, a polar monomer copolymerizable with the acrylic acid ester, a chain transfer agent, a free-radical initiator, and a modifier moiety selected from the group consisting of 2-polystyrylethyl methacrylate macromolecular monomers, reactive zinc salts and hydrophobic silicas. The premix is then combined with a water phase containing a sufficient amount of suspending agent to form a suspension. The suspension is concurrently agitated and polymerization of the polymer premix is permitted until polymer beads are formed. The polymer beads are then collected. The amount of the modifier moiety must be sufficient to render the copolymer bead non-agglomerating at room temperature for handling and transportation purposes.

The suspension beads are easily handleable and safely transportable. They are free flowing and do not agglomerate into unmanageable masses. They may be easily poured into tanks for transportation to distant manufacturing facilities. The beads are storage stable, and may be placed into storage tanks for long periods of time without undergoing physical or chemical degradation. The low Tg tacky polymer beads are prepared by an aqueous suspension polymerization technique utilizing modifier moiety to impart the handleability and transportability to the tacky suspension PSA beads. Although the beads disclosed in U.S. Pat. Nos. 4,833,179 and 4,952,650 are easily transportable they are not easily extrudable at low temperatures and must be extruded at 340° F. to 380° F. (171° C. to 194° C.). This is disadvantageous in that polymers are more susceptible to decomposition at such high temperatures.

The concept of inherent viscosity is important to the understanding of both extrudability and storage stability of suspension polymer beads. Inherent viscosity relates to the internal resistance to flow of a fluid. The inherent viscosity of a polymer or copolymer is related to a number of factors including molecular weight. Typically the higher the molecular weight of a polymer the higher its viscosity. Conversely, the lower the molecular weight of a polymer the lower its viscosity.

A low viscosity polymer is easier to coat due to its low internal resistance. However, a bead comprising a low viscosity polymer is more likely to clump during storage, due to its softness. This can cause problems during transportation and subsequent use since the beads will not easily pour when clumped together.

A high viscosity polymer is harder to coat due to its high internal resistance. Suspension beads comprising high viscosity polymers are less likely to be sticky and clump together. Thus, they have better storability. However, high viscosity polymers due to their lack of flow are difficult to pass through an extrusion coater unless high temperatures are employed. The use of high temperatures (i.e., about 350°-380° F.) to reduce the melt viscosity of the high viscosity polymer is disadvantageous in that decomposition of the polymer can occur at high temperatures.

Suspension polymerization in general is a well known method of polymerization in which the polymer formed is obtained as spherical beads or pearls. Other well known methods of polymerization include emulsion polymerization and solution polymerization. These methods both differ from suspension polymerization.

The polymer obtained via emulsion polymerization comprises fine particles of polymer stabilized by an emulsifier and dispersed uniformly in an aqueous phase. The dispersion obtained is often referred to as a "latex". No beads are obtained during emulsion polymerization.

Solution polymerization is a polymerization method which takes place in a solvent. The polymer obtained is also not in the form of a bead when solution polymerization is employed. Since no beads are obtained via solution or emulsion polymerization the balance between storage stability problems and extrusion problems are not encountered as they are in suspension polymerization.

Vinyl acetate has been used widely to copolymerize with acrylic esters via both solution and emulsion polymerization methods in order to form vinyl acrylic copolymer pressure sensitive adhesives. Such adhesives are less polar and adhere better to polyolefins and other nonpolar plastics, they usually exhibit a high tack, and may have a lower shear resistance as well as somewhat poorer aging properties than all acrylic adhesives. In addition, vinyl acetate is a less expensive monomer than acrylic esters. See Donatas Statas, *Handbook of Pressure Sensitive Adhesive Technology*, 2nd Ed. p 402, Van Nostrand Reinhold, 1989.

Christenson, U.S. Pat. No. 3,654,213 (issued Apr. 4, 1972) discloses pressure sensitive adhesives prepared via solution polymerization. The pressure sensitive adhesives are based on interpolymers of certain vinyl esters, of which vinyl acetate is one, and certain alkyl acrylates. The monomers are selected such that the interpolymers are compatible with liquid aliphatic hydrocarbons. The interpolymers of the art were only soluble in less desirable solvents of higher cost. Christenson's invention provided interpolymers which are compatible with less expensive aliphatic hydrocarbons.

Skouitchi et al. U.S. Pat. No. 4,069,123 discloses pressure sensitive adhesives based on acrylate ester homo and copolymers. The copolymers, which can be prepared via emulsion polymerization, are based on alkyl esters of acrylic and methacrylic acid and vinyl ester including vinyl acetate. Skoutichi relates to improved adhesive and cohesive properties obtained from the addition of specified quinone ultraviolet sensitizers.

Terpolymers of low $T_g$ acrylate/acrylic acid/vinyl acetate are known in the art and commercially available, such as Gelva ® terpolymers available from Monsanto. These terpolymers are made from solvent and emulsion polymerization processes.

Thus, vinyl acetate has been used to modify the adhesive properties of various polymers prepared via emulsion or solution polymerizations which are not formed as beads. The use of vinyl acetate in the suspension polymerization of PSAs to yield suspension beads possessing storage stability and extrudability at low temperatures has never been taught or suggested by any reference.

A need thus exists for 1) a suspension bead which is easily extrudable at low temperatures (i.e., below about 340° F., 170° C.) in addition to being storage stable and 2) a method of forming such a bead. A need thus exists for a suspension bead having the advantages of both low inherent viscosity polymers (for ease of extrusion) and high inherent viscosity polymers (for good storage stability) without the disadvantages of either.

We have discovered such a suspension bead and a method of making such a suspension bead.

BRIEF DESCRIPTION OF THE INVENTION

We have found a method of making a bead which can be extruded below 340° F. (170° C.) due to its low inherent viscosity but which is surprisingly storage stable, more so than known copolymers having the same inherent viscosity. We have discovered that vinyl acetate monomer can be copolymerized with a particular acrylic acid ester(s) and polar monomer(s) in order to produce surprisingly a low temperature extrudable as well as storage stable and thus easily transportable suspension PSA bead.

The present invention provides a method for the suspension polymerization of a pressure-sensitive acrylate copolymer bead having a glass transition temperature of 0° C. or less, comprising the steps of:

(a) making a monomer-containing premix comprising:
  (i) about 70 to about 98 parts by weight acrylic acid ester monomer of non-tertiary alcohol, the alcohol having from 1 to 14 carbon atoms, with the average number of carbon atoms being about 4 to about 12;
  (ii) about 1 to about 10 parts by weight polar monomer copolymerizable with the acrylic acid ester monomer; and
  (iii) about 1 to about 40 parts by weight vinyl acetate monomer;
  wherein (i), (ii), and (iii), comprise 100 parts by weight of the monomer-containing premix;
  (iv) about 0.01 to about 0.5 part by weight of a chain transfer agent; and
  (v) about 0.05 to about 1.0 part by weight of a free-radical initiator; and
  wherein the amounts of (iv) and (v) are each independently based upon 100 parts by weight total monomer content;

(b) combining said monomer-containing premix with a water phase containing a suspending agent to form an oil in water suspension;

(c) concurrently agitating the oil in water suspension and permitting polymerization of said monomers until copolymer beads are formed in water; and (d) collecting said polymer beads;

wherein about 0.0 to about 30 parts by weight total of a modifier moiety based upon 100 parts by weight total monomer content is present in one or more of the following: the monomer-containing premix; the water phase; the oil in water suspension; the aqueous suspension of polymer beads after the exotherm of the polymerization has been reached.

The present invention also provides copolymer beads prepared according to the above method. The present invention also provides sheet materials coated with adhesive prepared from the copolymer beads of the invention.

Unless otherwise noted, all percentages, parts, and ratios herein are by weight.

DETAILED DESCRIPTION OF THE INVENTION

The alkyl acrylate monomers useful in the present invention are monofunctional unsaturated acrylate ester monomers. Included within this class of monomers are, for example, isooctyl acrylate, isononyl acrylate, 2-ethylhexyl acrylate, decyl acrylate, dodecyl acrylate, n-butyl acrylate, hexyl acrylate, and mixtures thereof. Preferred monomers include isooctyl acrylate, isononyl acrylate, butyl acrylate, and mixtures thereof. Acrylate monomers comprise about 70 to about 98 parts based on 100 parts total monomer content, preferably from about 80 parts to about 97 parts in order to provide the best balance in terms of PSA properties and bead stability.

Vinyl acetate comprises about 0.1 to about 40 parts based upon 100 parts total monomer content, preferably about 2 to about 30 parts for reasons of providing a superior balance in terms of PSA properties, extrudability, and bead stability, and most preferably about 3 to about 20 parts in order to provide the best balance in terms of PSA properties. If greater than about 40 parts vinyl acetate is included, suspension instability during polymerization is encountered. If less than 0.1 part vinyl acetate is included, the effect of vinyl acetate on bead stability becomes too small.

Polar monomers useful in the method of the invention include both moderately polar and strongly polar monomers, and mixtures thereof. Polarity or hydrogen-bonding ability is frequently described by the use of terms such as "moderately", "strongly" and "poorly". References describing these and other solubility terms include "Solvents", *Paint Testing Manual*, 13th Ed. Sward, G. G., Editor, American Society for Testing and Materials, Philadelphia, Pennsylvania, 1972, and "A Three-Dimensional Approach to Solubility", *Journal of Paint Technology*, Vol. 38, No. 496, pp. 269-280, both incorporated by reference herein. Strongly polar monomers useful herein include acrylic acid, methacrylic acid, itaconic acid, hydroxyalkyl acrylates, styrene sulfonic acid or the sodium salt thereof, maleic acid, fumaric acid, citraconic acid, acrylamides, substituted acrylamides, and mixtures thereof. Moderately polar monomers useful herein include N-vinyl lactams such as N-vinyl pyrrolidone, N-vinyl caprolactam, acrylonitrile, dimethyl amino-propyl methacrylate, vinyl chloride, and mixtures thereof. Preferred polar monomers include acrylic acid, methacrylic acid, acrylamides, substituted acrylamides, and mixtures thereof. Polar monomers comprise up to about 10 parts based on the total monomer content. Polar monomers typically comprise about 1 to about 10 parts based upon 100 parts total monomer content, preferably about 2 to about 8 parts, in order to provide a superior balance in terms of PSA properties and bead stability, and most preferably about 3 to about 7 parts in order to provide the best balance in terms of PSA properties and bead stability. If too much polar monomer is used, suspension instability can result due to bead agglomeration. If not enough polar monomer is used, suspension instability can also result due to bead softness.

The following Table I indicates ranges of monomer in parts by weight for use in the method of the present invention and is based upon 100 parts total monomer content in the monomer-containing premix.

TABLE I

| | Useful (Parts by Weight) | Preferred (Parts by Weight) | Most Preferred (Parts by Weight) |
|---|---|---|---|
| Alkyl Acrylate Monomer | about 70 to about 98 | about 80 to about 97 | about 85 to about 96 |
| Polar Monomer | about 1 to about 10 | about 2 to about 8 | about 3 to about 7 |
| Vinyl Acetate | about 0.1 to about 40 | about 2 to about 30 | about 3 to about 20 |

Modifier moieties useful in the method of the present invention include reactive zinc salts, macromers, hydrophobic silica, and mixtures thereof. The modifier moiety can be present in an amount ranging from about 0.05 to about 30 parts per 100 parts by weight total monomer content, preferably about 0.1 to about 14 parts by weight for reasons of cost, and most preferably about 0.2 to about 10 parts by weight for reasons of performance. The amounts listed for the modifier moiety constitute the total amount added during the entire polymerization regardless whether it is added to one or more of the following phases selected from the group consisting of: the monomer-containing pre-mix; the water phase; the oil-in-water suspension; and the aqueous suspension of polymer beads after the exotherm of the polymerization has been reached. Total monomer content refers to the weight of acrylic acid ester monomer, polar monomer, and vinyl acetate monomer.

The modifier moiety is present in one or more of the following: the monomer-containing premix; the water phase; the oil-in-water suspension; or the aqueous suspension of polymer beads after the exotherm of the polymerization has been reached. Preferred moieties include the reactive zinc salts. Useful reactive zinc salts include those selected from the group consisting of zinc oxide and organic zinc compounds such as those selected from the group consisting of zinc methacrylates, zinc acrylates, zinc octoate, zinc acetate, zinc formate, mixtures thereof, and the like. If a zinc salt is used it is added at a range of about 0.05 to about 5 parts by weight based upon the total weight of the copolymer beads formed, preferably about 0.1 to about 2 parts by weight, most preferably about 0.2 to about 1 part by weight. The reactive zinc salts and/or hydrophobic silica may be added to the monomer-containing premix, alternatively, they may be added to the suspension after the exotherm has been reached (i.e., near the end of or after the polymerization). The hydrophobic silica is preferably added after the exotherm of the polymerization has been reached.

A variety of useful macromers for reinforcing PSA properties can also be used. The methods for their preparation are disclosed in U.S. Pat. No. 3,786,116; incorporated by reference herein. A particularly useful 1-polystyrylethyl methacrylate macromonomer is commercially available under the name Chemlink 4500 TM. This macromer is a high glass transition temperature ($T_g$): polymeric material, having a $T_g$ of about 90° C. or higher, and a number average molecular weight of from about 5,000 to about 25,000. The macromer can be present in an amount ranging from about 0.05 to about 20 parts based on 100 parts total monomer content, preferably about 0.1 to 10 parts for cost reasons, most preferably about 3 to about 7 parts. The macromer is added to the monomer-containing premix.

If hydrophobic silica is used preferably about 0.1 to about 5 parts by weight is used based upon the total weight of the copolymer beads formed, preferably about 0.5 to about 2 parts by weight, and most preferably about 0.8 to about 1.5 parts by weight.

The copolymer beads of the invention are prepared by an aqueous suspension polymerization technique utilizing conventional suspension agents with optional anionic surfactants. The amount of surfactant is 0 to about 1.0 part, preferably from about 2.5 ppm to about 1.0 part based on 100 parts total monomer content. Preferred surfactants include those selected from the group consisting of sodium lauryl sulfate, sodium dioctyl sulfosuccinate, and mixtures thereof. Non-ionic surfactants, such as the poly(ethylene oxide) type, may also be included so long as an anionic surfactant is present and the total amount of surfactants does not exceed about 1.0 part based on 100 parts total monomer content.

Suspending agents are those conventionally used in suspension polymerization processes. They may be minimally water-soluble inorganic salts such as tribasic calcium phosphate, calcium sulfate, barium sulfate, barium phosphate, hydrophilic silicas, and magnesium carbonate. Preferred inorganic suspending agents include barium sulfate, hydrophilic silicas, and tribasic calcium phosphate. Water-soluble organic suspending agents may also be used, e.g., polyvinyl alcohol, poly-N-vinyl pyrrolidone, polyacrylic acid, polyacrylamide and hydroxyalkyl cellulose. The suspending agent is present in amounts ranging from about 0.01 part to about 5 parts based on 100 parts total monomer content.

Initiators for polymerizing the monomers to provide the copolymer beads of the invention are those which are normally suitable for free-radical polymerization of acrylate monomers and which are oil-soluble and have low solubility in water, e.g., organic peroxides such as benzoyl peroxide, lauryl peroxide and various thermal initiators. Preferred thermal initiators include 2,2-azo-bis-isobutyronitrile, commercially available from E. I. duPont de Nemours under the trade name Vazo TM 64. The initiator is present in an amount from about 0.05 to about 1 part, preferably about 0.1 to about 1.0 part, based on 100 parts total monomer content.

Useful chain transfer agents include mercaptans, alcohols, carbon tetrabromide, and mixtures thereof. Isooctyl thioglycolate and carbon tetrabromide are preferred. The chain transfer agent is present in any amount of from about 0.01 to about 0.5 part, preferably about 0.01 to about 0.2 part based on 100 parts total monomer content.

Useful bases to adjust the pH of the suspension within the range of about 9 to about 11 if necessary include but are not limited to the known bases such as NaOH, NH$_4$OH, and the like.

Photocrosslinking agents may also be used according to the method of the invention. Preferred crosslinking agents include copolymerizable aromatic ketone monomers, especially acryloxybenzophenone. When present, the photocrosslinker generally comprises from about 0.01 to about 5.0 parts based on 100 parts total monomer weight.

The monomers, modifier moiety, chain transfer agent, free-radical initiator, and any optional materials are mixed together in the prescribed ratio to form a monomer-containing premix. They are then combined with a water phase comprising a suspending agent, water, and any optional surfactant in order to form a suspension. The resulting suspension typically comprises about 10 to about 55 weight percent monomer-containing premix and about 90 to about 45 weight percent water phase, preferably about 40 to about 45 weight percent monomer-containing premix and about 10 to about 55 weight percent water phase. Above about 55 weight percent monomer containing premix, phase inversion may occur. The monomers contained in the suspension are typically polymerized with agitation for from about 2 to about 16 hours at a temperature of from about 40° C. to about 90° C. to give a suspension which contains the copolymer beads. The beads are then washed and separated from the water by means such as gravity filtration. The filtered product also generally comprises about 15 to 30 percent water.

Compositions made by the process of the invention may also contain one or more conventional additives. Preferred additives include tackifiers, plasticizers, pigments and dyes, extenders, fillers, antioxidants, stabilizers and multifunctional crosslinkers. An especially preferred additive is bis-vinyl ether. When present, this additive generally comprises from about 0.5 to about 1 part based on 100 parts total monomer content.

Another preferred group of additives are those which will react with acid groups which are present on the surface of the copolymer bead to impart a charge to the bead during polymerization. Such acid groups include carboxylic groups pendant from the polymer backbone, contributed by the MAA or AA monomer polymerized into the copolymer. Such additives include inorganic bases such as those selected from the group consisting of ammonia, tertiary amines, lithium hydroxide, sodium hydroxide, potassium hydroxide, calcium carbonate, zinc oxide, and mixtures thereof. The introduction of a charge provides extra storage stability due to electrostatic repulsion between the beads.

The copolymer beads are relatively large in size, typically having diameters in the range of 5 to about 500 micrometers, more preferably about 100 to about 300 micrometers, and have a $T_g$ of about 0° C. or less, preferably about −50° C.

The adhesives which are formed from the beads of the present invention typically have inherent viscosities of about 0.6 to about 1.5 deciliters/gram, in ethyl acetate preferably about 0.65 to about 0.8 deciliters/gram in order to facilitate extrusion at low temperatures (below about 170° C.), and most preferably about 0.8 to about 1.3 deciliters/gram if compounding with tackifiers is desired.

The filtration products of the present invention, comprising the beads and water, are surprisingly easily extruded at low temperatures (i.e., less than about 170° C.) in addition to being easily processed, and easily and safely transported. In addition, they are surprisingly free flowing, they do not agglomerate into unmanageable masses, and they may be easily poured. In addition, the beads are storage-stable, and may be stored for long periods of time without undergoing physical or chemical degradation. Because the beads are stored in water rather than in organic solvents, they may be transported and stored without the elaborate safety and environmental procedures necessary when organic solvents are present.

Vinyl acetate and alkyl acrylates differ from each other in terms of water solubilities and reactivity ratios. For example, the water solubility of vinyl acetate is 2.5 grams whereas that of isooctyl acrylate is 0.01 gram. The term "water solubility" as used herein refers to the grams of monomer soluble in 100 grams of water at room temperature. The reactivity ratios of vinyl acetate and isooctyl acrylate are $r_1$(vinyl acetate)=0.04 and $r_2$(isooctyl acetate)=7.5, respectively. Thus, isooctyl acrylate is more readily polymerized than vinyl acetate. The values of the reactivity ratios suggest that alkyl acrylate radicals such as isooctyl acrylate radicals will add to isooctyl acrylate monomer preferentially over vinyl acetate. This preferential polymerization of isooctyl acrylate over vinyl acetate coupled with the fact that vinyl acetate is more soluble in water may result in the delay of polymerization of vinyl acetate during a later stage of the polymerization process. We theorize that the polymerized vinyl acetate thus resides predominantly on the shell (exterior) of the beads, which provides the beads with additional stability towards clumping due to the non-tacky nature of vinyl acetate homopolymer. Therefore, although not wishing to be bound by the theory presented above, we theorize that the superior PSA bead stability is due to the unique combination of vinyl acetate hydrophilicity and the reactivity of alkyl acrylates towards vinyl acetate.

METHODS OF MANUFACTURE

Copolymer beads of the present invention are useful in any applications in which acrylate adhesives otherwise produced may be used. In order to make adhesive coated products, the copolymer beads may be extruded. Such extrusion destroys the bead configuration and results in a continuous film of pressure-sensitive adhesive. These adhesive compositions may be applied to a backing via extrusion coating. If the composition is to be used as a tape, it is coated onto a flexible carrier web; if it is to be used as a transfer film, it may be applied to a release liner such as a silicone-coated paper.

The copolymer beads of the invention are specifically designed to facilitate their extrusion at low temperatures. Thus, extrusion is the preferred method of application. However, the adhesive may be applied by other conventional methods if so desired such as roller coating or dip coating if the beads are dissolved in a compatible solvent system.

TEST METHODS

The test methods used in evaluation of various examples of the invention for determining peel adhesion and shear are those described by the American Society for Testing and Materials and in *Test Methods for Pressure-Sensitive Tapes*, Eighth Edition, August 1985, Pressure-Sensitive Tape Council, Glenview, Ill., incorporated by reference herein.

PEEL ADHESION

ASTM P3330-78 PSTC-1 (11/75)

Peel adhesion is the force required to remove a coated flexible sheet material from a test panel measured at a specific angle and rate of removal. In the examples this force is expressed in Newtons per 100 mm (N/100 mm) width of coated sheet. The procedure follows:

1. A 12.5 mm width of the coated sheet is applied to the horizontal surface of a clean glass test plate with at least 12.7 lineal cm in firm contact. A hard rubber roller is used to apply the strip.
2. The free end of the coated strip is doubled back nearly touching itself, so the angle of removal will be 180°. The free end is attached to the adhesion tester scale.
3. The glass test plate is clamped in the jaws of the tensile testing machine which is capable of moving the plate away from the scale at a constant rate of 2.3 meters per minute.
4. The scale reading in Newtons is recorded as the tape is peeled from the glass surface. The data is recorded as the average value of the range of numbers observed during the test.

SHEAR HOLDING STRENGTH

Reference: ASTM: D3654-78; PSTC-7

The shear strength is a measure of the cohesiveness or internal strength of an adhesive. It is based upon the amount of force required to pull an adhesive strip from a standard flat surface in a direction parallel to the surface to which it has been affixed with a definite pressure. It is measured in terms of time (in minutes) required to pull a standard area of adhesive coated sheet material from a stainless steel test panel under stress of a constant, standard load.

The tests were conducted on adhesive coated strips applied to a stainless steel panel such that a 12.5 mm by 12.5 mm portion of each strip was in firm contact with the panel with one end portion of the tape being free. The panel with coated strip attached was held in a rack such that the panel forms an angle of 178° with the extended tape free end which is then tensioned by application of a force of one kilogram applied as a hanging weight from the free end of the coated strip. The 2° less than 180° is used to negate any peel forces thus insuring that only the shear forces are measured in an attempt to more accurately determine the holding power of the tape being tested. The time elapsed for each tape example to separate from the test panel is recorded as the shear strength.

INHERENT VISCOSITY MEASUREMENT

In order to understand the benefits derived from the teachings of this invention, it is necessary to relate the improvements in extrusion to the molecular weight of the adhesive. For this purpose, the measurement of the viscosity of dilute solutions of the adhesive, which is known to correlate with the polymer molecular weight, clearly demonstrates the degree of improvement when compared to controls run under the same conditions. It is the comparative values which are significant and absolute figures are not required.

The inherent viscosity (I.V.) is measured by conventional means using a Cannon-Fenske #50 viscometer in a water bath controlled at 25° C. to measure the flow time of 10 ml of a polymer solution (0.2 g of polymer per deciliter ethyl acetate). The examples and control examples being run for comparison were run under identical conditions. The units for inherent viscosity are deciliters per gram.

BEAD STORAGE STABILITY

A 70% suspension polymer bead/30% water composition was stored in a jar having a cover at room temperature (i.e. 21° C.). The amount of time for the beads to become stringy and clump together was used to define bead storability. Beads with poor storability will clump together within one week of storage time. Beads with good storability will not clump together after one week of storage time.

The following examples are intended to be illustrative, and should not be construed as limiting the invention. The examples employ materials as follows:

MATERIAL

| IOA | isooctyl acrylate |
| IOTG | isooctyl thioglycolate |
| ZnO | zinc oxide |
| MAA | methacrylic acid |
| PSA | pressure sensitive adhesive |
| VOAC | vinyl acetate |

EXAMPLES

Examples 1-4

The reaction was carried out in a two liter split flask equipped with condenser, thermowell, nitrogen inlet, stainless steel motor-driven agitator, and heating mantle with temperature control. The reaction flask was first charged with 750 g. of deionized water to which was added 2.5 g. of zinc oxide and 0.75 g. of Cab-O-Sil ® EH-5 hydrophilic silica available from Cabot Corporation. The reactor is heated to 55° C. while purging with nitrogen until the zinc oxide and EH-5 hydrophilic silica have been thoroughly dispersed. A premixed charge of isooctyl acrylate, vinyl acetate, and methacrylic acid (as specified in Table II) to which has been added 2.5 g. of Vazor TM-64 initiator (2',2'-azobisisobutyronitrile, AIBN) available from Dupont, and isooctyl thioglycolate (as specified in Table II) was prepared and mixed until a solution had been obtained. The resulting solution which contained initiator and chain transfer agent was then added to the initial aqueous mixture while vigorous agitation (700 rpm) was maintained in order to obtain a good suspension. The reaction was continued with nitrogen purging for at least 6 hours during which time it was monitored to prevent an exothermic reaction from taking the reaction above about 90° C. After polymerization, one part by weight of Aerosil ® R-972 hydrophilic silica, available from Degussa Corporation, was mixed with the aqueous PSA bead suspension. The PSA beads were then collected by using a Buchner funnel and washed several times with deionized water. The resulting PSA beads which contained about 15 to 30% of water were stable for storage, transportation, and handling for further processing. These beads were dried and extrusion coated on film to a dried thickness of 23 microns, and tested for peel adhesion and shear, values for which appear in Table II. The inherent viscosity (I.V.) values of the copolymer are also shown in Table II.

TABLE II

| Example | Parts IOA | Parts MMA | Parts VOAC | Parts IOTG[1] | (Minutes) Shear | Peel Adhesion | I.V. | Bead Storage Stability | Extrusion temperature °C. |
|---|---|---|---|---|---|---|---|---|---|
| 1 | 470 | 20 | 10 | 0.1 | 38 | 27 | 0.71 | Storage Stable | 150° or greater |
| 2 | 430 | 20 | 50 | 0.1 | 39 | 29 | 0.75 | Storage stable | 150° or greater |
| 3 | 405 | 20 | 75 | 0.1 | 133 | 25 | 0.70 | Storage Stable | 150° or greater |
| 4 | 380 | 20 | 100 | 0.1 | 278 | 27 | 0.68 | Storage Stable | 150° or greater |
| Comparative Example 5 | 480 | 20 | 0 | 0.05 | 20 | 29 | 1.1 | Storage Stable | 170° or greater |
| Comparative Example 6 | 480 | 20 | 0 | 0.1 | 1 | 30 | 0.70 | Agglomerated After 8 Hours In Storage jar | 150° or greater |

[1]parts of IOTG is based on 100 parts total monomer content

Comparative Examples 5 and 6

The procedure of Examples 1–4 was followed except that no vinyl acetate (VOAC) was included. Shear, adhesion, I.V., bead stability, and extrusion temperature are reported in Table II. Comparative Example 6 demonstrates that beads formed without VOAC have a low enough viscosity to be easily extrudable but agglomerate after 8 hours in a storage jar and thus have poor transportability. Comparative Example 5 demonstrates that beads formed without VOAC which are storage stable must have an inherent viscosity that is so high (i.e., 1.1) that they can only be extruded at high temperatures. Thus, VOAC is necessary for a storage stable low I.V. bead. Therefore, suspension beads which do not contain VOAC can be prepared which are extrudable at low temperatures but which are not storage stable (Comparative Example 6) or which are storage stable but extrudable only at high temperatures (Comparative Example 5).

The extrusion temperatures referred to in Table II for Comparative Examples 5 and 6 represent the lowest temperatures at which the copolymer beads could be effectively extruded. The extrusion temperatures referred to in Table II for Examples 1–4 represent the highest temperature at which the copolymer beads could be effectively extruded.

While this invention has been described in connection with specific embodiments, it should be understood that it is capable of further modification. The claims herein are intended to cover those variations which one skilled in the art would recognize as the chemical equivalent of what has been described here.

What is claimed is:

1. A method for suspension polymerization of a pressure-sensitive acrylate copolymer bead having a glass transition temperature of 0° C. or less, comprising the steps of:
   (a) making a monomer-containing premix comprising
      (i) about 70 to about 98 parts by weight acrylic acid ester monomer of non-tertiary alcohol, said alcohol having from 1 to 14 carbon atoms, with the average number of carbon atoms being about 4 to about 12;
      (ii) about 1 to about 10 parts by weight polar monomer copolymerizable with said acrylic acid ester monomer;
      (iii) about 1 to about 40 parts by weight vinyl acetate monomer;
      wherein (i), (ii), and (iii) comprise 100 parts by weight of said monomer-containing premix;
      (iv) about 0.01 to about 0.5 part by weight chain transfer agent;
      (v) about 0.05 to about 1.0 parts by weight free-radical initiator; and
      wherein (iv) and (v) are each independently based upon 100 parts by weight total monomer content;
   (b) combining said monomer-containing premix with a water phase containing a suspending agent to form an oil-in-water suspension;
   (c) concurrently agitating said suspension and permitting polymerization of said monomers until copolymer beads are formed in water; and
   (d) collecting said copolymer beads; wherein about 0.05 to about 30 parts by weight total of a modifier moiety based upon 100 parts by weight total monomer content is present in one or more of the following: said monomer-containing premix, said water phase; said oil-in-water suspension; the aqueous suspension of polymer beads after the exotherm of the polymerization has been reached.

2. The method of claim 1 wherein the modifier moiety is selected from the group consisting of reactive zinc salts, macromers, hydrophobic silica, and mixtures thereof.

3. The method of claim 1 wherein the modifier moiety is a reactive zinc salt selected from the group consisting of zinc methacrylates, zinc acrylates, zinc oxides, zinc acetate, zinc formate, and mixtures thereof.

4. A method for suspension polymerization of a pressure-sensitive acrylate copolymer bead having a glass transition temperature of 0° C. or less, comprising the steps of:
   (a) making a monomer-containing premix comprising
      (i) about 80 to about 97 parts acrylic acid ester monomer of non-tertiary alcohol, said alcohol having from 1 to 14 carbon atoms, with the average number of carbon atoms being about 4 to about 12;
      (ii) about 2 to about 8 parts by weight polar monomer copolymerizable with said acrylic acid ester;
      (iii) about 2 to about 30 parts by weight vinyl acetate monomer;
      wherein (i), (ii), and (iii) comprise 100 parts by weight of said monomer-containing premix;
      (iv) about 0.01 to about 0.2 part by weight chain transfer agent; and
      (v) about 0.1 to about 1 part by weight free-radical initiator;
      wherein (iv) and (v) are each independently based upon 100 parts by weight total monomer content;
   (b) combining said monomer-containing premix with a water phase containing a suspending agent to form an oil-in-water suspension;

(c) concurrently agitating said suspension and permitting polymerization of said monomer until polymer beads are formed in water; and (d) collecting said polymer beads;

wherein about 0.1 to about 14 parts by weight modifier moiety based upon 100 parts by weight total monomer content is present in one or more of the following: said monomer-containing premix, said water phase; said oil-in-water suspension; the aqueous suspension of polymer beads after the exotherm of the polymerization has been reached.

5. A method according to claim 4 comprising the steps of: (a) making a monomer-containing premix consisting essentially of:

(i) from about 85 to about 96 parts by weight of an acrylic acid ester monomer selected from the group consisting of 2-ethylhexyl acrylate, isooctyl acrylate, dodecyl acrylate, isononyl acrylate, butyl acrylate, and mixtures thereof;

(ii) from about 3 to about 7 parts by weight of a polar copolymerizable monomer selected from the group consisting of acrylic acid, methacrylic acid, acrylamide, N-vinyl pyrrolidone, and mixtures thereof;

(iii) from about 3 to about 20 parts vinyl acetate monomer;

wherein (i), (ii), and (iii) comprise 100 parts by weight of said monomer-containing premix;

(iv) from about 0.01 to about 0.2 part by weight of a chain transfer agent selected from the group consisting of mercaptans, alcohols, carbon tetrabromide, and mixtures thereof;

(v) from 0.1 to 7 parts by weight of a modifier moiety selected from the group consisting of 2-polystyrylethyl methacrylate macromolecular monomer, zinc methacrylates, zinc acrylates, zinc oxide, zinc formate, and mixtures thereof; and (vi) from about 0.01 to about 1 part by weight 2,2'-azobisbutyronitrile;

(b) forming a suspension by combining said monomer-containing premix with a water phase comprising:

(i) from about 0.01 to about 5 parts by weight of a suspending agent, based upon 100 parts total monomer content;

(ii) from about 0 to about 1.0 part of surfactant based upon 100 parts total monomer content; and (iii) water;

(c) concurrently agitating said suspension and permitting polymerization of said monomer for at least 4 hours at from about 40° C. to about 75° C. to form copolymer beads; and (d) collecting said copolymer beads.

6. A method for suspension polymerization of a pressure-sensitive acrylate copolymer bead having a glass transition temperature of 0° C. of less, comprising the steps of:

(a) making a monomer-containing premix comprising:

(i) about 70 to about 98 parts acrylic acid ester monomer of non-tertiary alcohol said alcohol having from 1 to 14 carbon atoms, with the average number of carbon atoms being from about 4 to about 12;

(ii) about 1 to about 10 parts polar monomer copolymerizable with said acrylic acid ester monomer;

(iii) about 1 to about 40 parts vinyl acetate monomer;

wherein (i), (ii), and (iii) comprise 100 parts by weight of said monomer-containing premix;

(iv) about 0.01 to about 0.5 part by weight chain transfer agent;

(v) about 0.05 to about 1.0 part by weight free-radical initiator;

wherein (iv) and (v) are each based upon 100 parts by weight total monomer content;

(b) combining said monomer-containing premix with a water phase containing a suspending agent to form a suspension;

(c) concurrently agitating and polymerizing said suspension until polymer beads begin to form;

(d) optionally adding a base, if needed, to adjust the pH of said suspension in the range of about 9 to about 11; and (e) collecting said copolymer beads; wherein about 0.05 to about 30 parts by weight total of a modifier moiety based upon 100 parts by weight total monomer content is present in one or more of the following: said monomer-containing premix, said water phase; said oil-in-water suspension; the aqueous suspension of polymer beads after the exotherm of the polymerization has been reached.

7. A storage-stable, safely handleable and transportable pressure-sensitive copolymer bead made by the process of claim 1.

8. A storage-stable, safely handleable and transportable pressure-sensitive copolymer bead made by the process of claim 2.

9. A storage-stable, safely handleable and transportable pressure-sensitive copolymer bead made by the process of claim 3.

10. A storage-stable, safely handleable and transportable pressure-sensitive copolymer bead made by the process of claim 4.

11. A storage-stable, safely handleable and transportable pressure-sensitive copolymer bead made by the process of claim 5.

12. A storage-stable, safely handleable and transportable pressure-sensitive copolymer bead madeby the process of claim 6.

13. A free-flowing copolymer bead made by drying said copolymer beads of claim 7.

14. A free-flowing copolymer bead made by drying said copolymer beads of claim 8.

15. A free-flowing copolymer bead made by drying said copolymer beads of claim 9.

16. A free-flowing copolymer bead made by drying said copolymer beads of claim 10.

17. A free-flowing copolymer bead made by drying said copolymer beads of claim 11.

18. A free-flowing copolymer bead made by drying said copolymer beads of claim 12.

19. A sheet material comprising a pressure-sensitive acrylate adhesive made from the copolymer beads of claim 13.

20. A sheet material comprising a pressure-sensitive acrylate adhesive made from the copolymer beads of claim 14.

21. A sheet material comprising a pressure-sensitive acrylate adhesive made from the copolymer beads of claim 15.

22. A sheet material comprising a pressure-sensitive acrylate adhesive made from the copolymer beads of claim 16.

23. A sheet material comprising a pressure-sensitive acrylate adhesive made from the copolymer beads of claim 17.

24. A sheet material comprising a pressure-sensitive acrylate adhesive made from the copolymer beads of claim 18.

25. Storage-stable pressure-sensitive adhesive copolymer beads having a glass transition temperature of 0° C. or less, comprising:
- (a) about 70 to about 98 parts by weight acrylic acid ester monomer of non-tertiary alcohol, said alcohol having from 1 to 14 carbon atoms, with the average number of carbon atoms being about 4 to about 12;
- (b) about 1 to about 10 parts by weight polar monomer copolymerizable with said acrylic acid ester monomer;
- (c) about 1 to about 40 parts by weight vinyl acetate monomer;

wherein (a), (b), and (c) comprise 100 parts by weight of monomers of said copolymer bead;

- (d) about 0.1 to about 0.5 parts by weight of a chain transfer agent;
- (e) about 0.05 to about 1.0 parts by weight of a free-radical initiator; and
- (f) about 0.5 to about 30 parts by weight of a modifier moiety;

wherein (d), (e), and (f) are each independently based upon 100 parts by weight total monomer content;

wherein said copolymer beads are prepared by suspension polymerization, and wherein preparation of said copolymer beads results in a non-agglomerating aqueous suspension of said beads, and wherein said adhesives formed from said copolymer beads exhibit inherent viscosities of from about 0.6 deciliters/g to about 1.5 deciliters/g.

26. A pressure-sensitive adhesive coated substrate comprising a substrate having the beads of claim 25 extruded thereon.

* * * * *

UNITED STATES PATENT AND TRADEMARK OFFICE
CERTIFICATE OF CORRECTION

PATENT NO. : 5,292,844
DATED : March 8, 1994
INVENTOR(S) : CHUNG I. YOUNG AND STEPHEN E. KRAMPE It is certified that error appears in the above-indentified patent and that said Letters Patent is hereby corrected as shown below:

Title                    "THEREFROM AND" should read --THEREFROM, AND--.

Col. 1, line 24,    "acrylatecopolymer" should read --acrylate copolymer--.

Col. 3, line 67,    "0.0" should read --0.05--.

Col. 12, line 48 (Claim 4 [i])    "parts acrylic" should read --parts by weight acrylic--.

Col. 13, line 57 (Claim 6)    "0° C. of less" should read --0° C. or less--.

Col. 14, line 43 (Claim 12)    "bead madeby" should read --bead made by--.

Signed and Sealed this

Tenth Day of January, 1995

Attest:

BRUCE LEHMAN

Attesting Officer    Commissioner of Patents and Trademarks